(12) United States Patent
 Lau et al.

(10) Patent No.: US 11,956,248 B2
(45) Date of Patent: *Apr. 9, 2024

(54) SYSTEM AND METHOD FOR MESSAGE RECIPIENT VERIFICATION

(71) Applicant: ROYAL BANK OF CANADA, Toronto (CA)

(72) Inventors: Alex Tak Kwun Lau, Toronto (CA); Edison U. Ortiz, Toronto (CA); Akhil Gupta, Toronto (CA); Mohit Sharma, Toronto (CA); Lucas Joseph Manuel, Toronto (CA); Tian Jou Tendy Su, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 139 days.

This patent is subject to a terminal disclaimer.

(21) Appl. No.: 17/245,851

(22) Filed: Apr. 30, 2021

(65) Prior Publication Data

US 2021/0258324 A1  Aug. 19, 2021

Related U.S. Application Data

(63) Continuation of application No. 15/829,240, filed on Dec. 1, 2017, now Pat. No. 10,999,294.

(Continued)

(51) Int. Cl.
*H04L 29/06* (2006.01)
*H04L 9/32* (2006.01)
(Continued)

(52) U.S. Cl.
CPC .......... *H04L 63/123* (2013.01); *H04L 9/3271* (2013.01); *H04L 63/0442* (2013.01);
(Continued)

(58) Field of Classification Search
CPC . H04L 63/123; H04L 9/3271; H04L 63/0442; H04L 63/0492; H04L 63/0876
See application file for complete search history.

(56) References Cited

U.S. PATENT DOCUMENTS 7,991,694 B2    8/2011  Takayama
10,169,587 B1*  1/2019  Nix ..................... H04W 12/041
(Continued)

FOREIGN PATENT DOCUMENTS

CA      2864030 A1    8/2013

OTHER PUBLICATIONS

PCT, Written Opinion and International Search Report of International Patent Application No. PCT/CA2017/051451, dated Mar. 13, 2018.

*Primary Examiner* — Phy Anh T Vu
(74) *Attorney, Agent, or Firm* — Norton Rose Fulbright Canada LLP (57) ABSTRACT

An electronic device includes a communication interface and at least one processor configured for: transmitting to or receiving from a second electronic device over proximity-based communication channel an introduction message including a first encryption key; receiving, from a server via the at least one communication interface, a challenge notification providing notification of a challenge to be completed to initiate a data process, the challenge notification including or providing access to at least one data field associated with a verification challenge; identifying, from the at least one data field, an encrypted challenge response value; decrypting the encrypted challenge response value (Continued)

with a key corresponding to the first encryption key; and transmitting the decrypted challenge response value to the server to complete the challenge to initiate the data process.

18 Claims, 9 Drawing Sheets

Related U.S. Application Data (60) Provisional application No. 62/546,107, filed on Aug. 16, 2017, provisional application No. 62/428,659, filed on Dec. 1, 2016.

(51) Int. Cl.
- *H04L 9/40* (2022.01)
- *H04W 4/80* (2018.01)
- *H04W 12/06* (2021.01)
- *H04W 12/108* (2021.01)

(52) U.S. Cl.
CPC ...... *H04L 63/0492* (2013.01); *H04L 63/0876* (2013.01); *H04W 4/80* (2018.02); *H04W 12/06* (2013.01); *H04W 12/108* (2021.01); *H04L 2209/805* (2013.01)

(56) References Cited

U.S. PATENT DOCUMENTS

| | | | |
|---|---|---|---|
| 10,855,664 B1* | 12/2020 | Ziraknejad | H04W 4/02 |
| 11,140,157 B1* | 10/2021 | Xia | H04L 63/0853 |
| 2006/0165060 A1 | 7/2006 | Dua | |
| 2007/0179905 A1 | 8/2007 | Buch et al. | |
| 2015/0032634 A1 | 1/2015 | D'Agostino | |
| 2016/0012399 A1 | 1/2016 | Etchegoyen | |
| 2016/0098402 A1 | 4/2016 | Filippi et al. | |
| 2016/0109954 A1 | 4/2016 | Harris et al. | |
| 2016/0189151 A1* | 6/2016 | He | G06Q 20/401 705/75 |
| 2016/0267476 A1 | 9/2016 | Beelen et al. | |
| 2016/0267575 A1 | 9/2016 | Garcia et al. | |
| 2016/0308862 A1 | 10/2016 | Rolfe | |
| 2017/0150349 A1 | 5/2017 | Huh et al. | |
| 2017/0255937 A1* | 9/2017 | Maddukuri | G06Q 20/3674 |
| 2017/0288884 A1 | 10/2017 | Kohli | |
| 2018/0109386 A1 | 4/2018 | Khan et al. | |
| 2018/0336542 A1 | 11/2018 | Wilson et al. | |
| 2020/0120087 A1* | 4/2020 | Sreenivas | H04L 63/0492 |

\* cited by examiner

SYSTEM AND METHOD FOR MESSAGE RECIPIENT VERIFICATION

CROSS-REFERENCE TO RELATED APPLICATIONS

This application is a continuation of U.S. patent application Ser. No. 15/829,240, filed on Dec. 1, 2017, and entitled "SYSTEM AND METHOD FOR MESSAGE RECIPIENT VERIFICATION, which claims all benefit including priority to United States Provisional Patent Application 62/428,659, filed Dec. 1, 2016, and entitled "SYSTEM AND METHOD FOR MESSAGE RECIPIENT VERIFICATION"; and to U.S. Provisional Patent Application 62/546,107, filed Aug. 16, 2017, and entitled "SYSTEM AND METHOD FOR MANAGEMENT OF POINT-TO-POINT TRANSACTIONAL DATA MESSAGES". The entire contents of each of these applications are hereby incorporated by reference.

FIELD

Embodiments of the present disclosure generally relate to the field of electronic message processing, and more specifically, embodiments relate to electronic message processing requiring identity verification.

BACKGROUND

Messaging applications often rely on a central identity provider to verify the authenticity of a sender and a recipient of a message. For example, in messaging or social networking applications, users often sign into an authenticated session with their credentials to verify their identities.

It is however not always the case that a central identity provider exists for a particular application. For example, INTERACT™ email money transfer (IEMT) enables money movement between any parties as long as the recipients have access to an email address. In order to accept the IEMT, the recipient is required to answer a challenge question which is created by the sender.

To be effective, the sender must come up with a challenge question that the recipient would know the answer to, but could not be easily guessed or ascertained by a third party who may intercept the email.

SUMMARY

In some embodiments, aspects of the present disclosure may reduce the risk associated with a challenge process required in a multi-party data process initiation.

In accordance with one aspect, there is provided an electronic device. The electronic device includes at least one communication interface; at least one memory; and at least one processor configured for: transmitting to or receiving from a second electronic device over proximity-based communication channel an introduction message including a first encryption key; receiving, from a server via the at least one communication interface, a challenge notification providing notification of a challenge to be completed to initiate a data process, the challenge notification including or providing access to at least one data field associated with a verification challenge; identifying, from the at least one data field, an encrypted challenge response value; decrypting the encrypted challenge response value with a key corresponding to the first encryption key; and transmitting the decrypted challenge response value to the server to complete the challenge to initiate the data process.

In accordance with another aspect, there is provided a method for multi-party initiation of a data process. The method includes: at a first electronic device, transmitting to or receiving from a second electronic device over proximity-based communication channel an introduction message including a first encryption key; receiving, from a server via at least one communication interface, a challenge notification providing notification of a challenge to be completed to initiate a data process, the challenge notification including or providing access to at least one data field associated with a verification challenge; identifying, from the at least one data field, an encrypted challenge response value; decrypting the encrypted challenge response value with a key corresponding to the first encryption key; and transmitting the decrypted challenge response value to the server to complete the challenge to initiate the data process.

In accordance with another aspect, there is provided an electronic device, comprising: at least one communication interface; at least one memory; and at least one processor configured for: transmitting to or receiving from a second electronic device over proximity-based communication channel an introduction message including a first encryption key; generating a challenge response value and encrypting the challenge response value with a key corresponding to the first encryption key; and transmitting a processing request to a server, the processing request including a plurality of data fields including: the challenge response value in a challenge response field, and the encrypted response value in at least one other field of the plurality of fields; wherein the processing request requests initiation of a data process at the server when a verification challenge presented to the second electronic device is completed, the verification challenge including the at least one other field.

In accordance with another aspect, there is provided a method for multi-party initiation of a data process, the method comprising: at a first electronic device, transmitting to or receiving from a second electronic device over proximity-based communication channel an introduction message including a first encryption key; generating a challenge response value and encrypting the challenge response value with a key corresponding to the first encryption key; and transmitting a processing request to a server, the processing request including a plurality of data fields including: the challenge response value in a challenge response field, and the encrypted response value in at least one other field of the plurality of fields; wherein the processing request requests initiation of a data process at the server when a verification challenge presented to the second electronic device is completed, the verification challenge including the at least one other field.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

In some applications, such as a payment processing application, a trusted server sits between a sender device and a recipient device. However, to increase compatibility, the trusted server may not act as an identity provider which validates the authenticity of the sender and the recipient.

In some systems, such as the INTERACT™ email money transfer (IEMT) system, communication with a central server can occur via an unsecure channel such as email. For example, in IEMT, a sender device only has to provide an email address of the recipient with which the IEMT server initiates communication with the recipient. However, email is an inherently unsecure communication mechanism which can be subject to interception, eavesdropping, impersonation, etc.

In order to authenticate the recipient, the server may receive one or more input fields from the sender device. For example, the server may receive one or more messages from the sender device including data in a challenge question field and a challenge answer field. In order to be effective, the sender must create a challenge which only the recipient would be able to answer. This verification process can be weak if the challenge inputted by the sender is based on information that would be easy to guess or that a third party may be able to ascertain. "What is your birthday?", "What is my middle name?", and "What is my dog's name?" are examples of information which may be discovered by a third party through a social media website or otherwise. In another example, the sender may verbally tell the recipient the answer to the inputted challenge in person or over the phone. In some instances, this verbal communicate may be eavesdropped by a third party.

While strong challenge questions can be a somewhat effective authentication mechanism, in some instances, the creation and answering of a challenge question may be a burden. In situations where the sender is with the recipient and can visually confirm the recipient's identify, the challenge-answer mechanism may be redundant.

In some instances, aspects of the example embodiments illustrated herein may simplify the authentication process when the sender and the recipient are within proximity of each other. In some embodiments, a simplified process may operate with an existing central server with little or no modification to the server.

In some instances, aspects of the example embodiments illustrated herein may improve the security of the authentication process. In some embodiments, the improvement in security may be realized with little or no modification to existing central servers.

Figure 1:
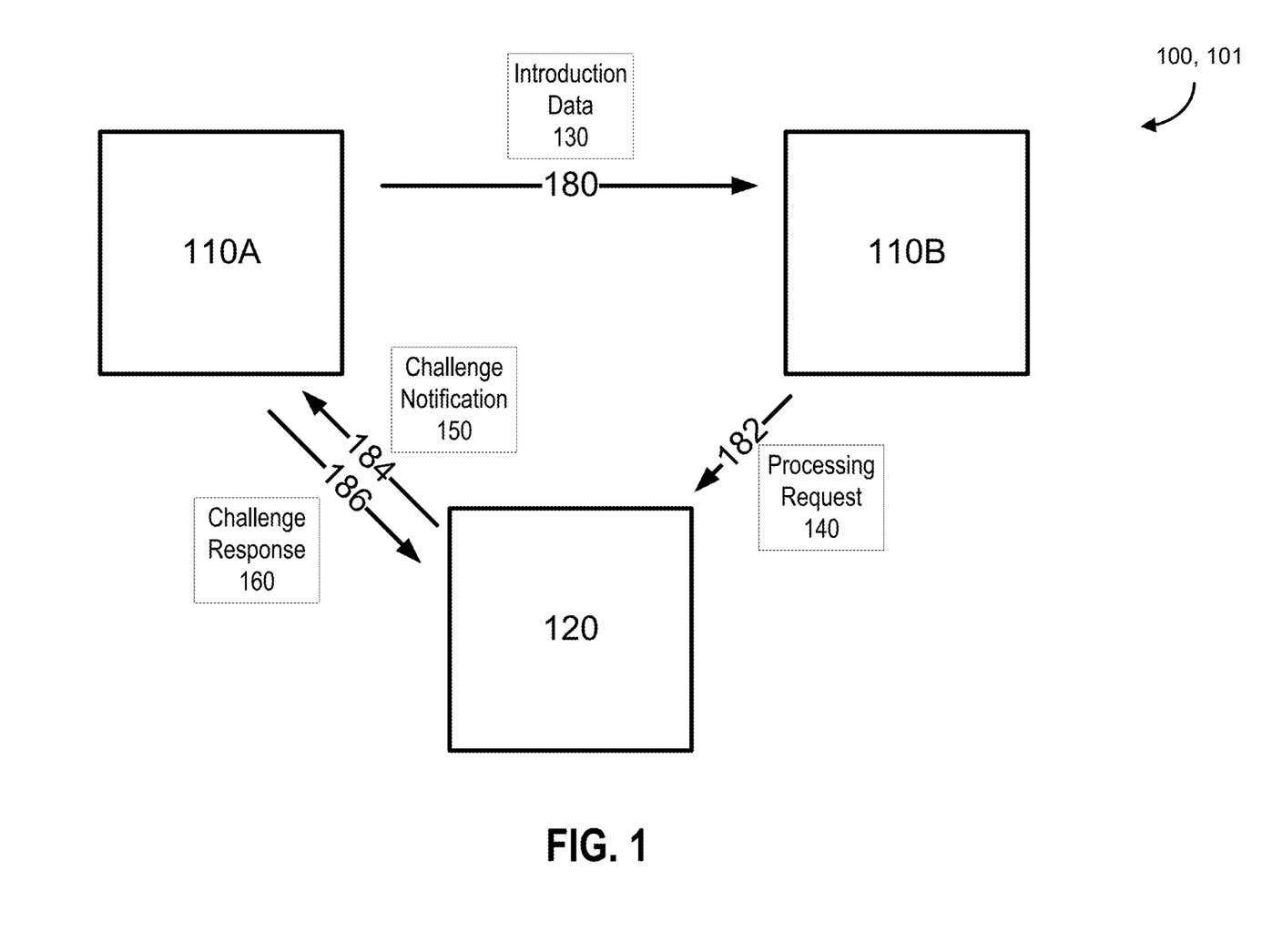
FIG. 1 is a schematic diagram showing aspects of an example system and data flow.

FIG. 1 shows aspects of an example system 100 and data flow 101 between devices in the system. The system 100 includes a device 110A associated with a recipient, a device 110B associated with a sender, and a server 120. In an example situation, the sender and the recipient devices are in close proximity to each other. For example, a sender and a recipient may be having dinner together and the sender may want to reimburse a recipient for paying the bill.

At 180, the recipient's device 110A sends introduction data 130 to the sender's device 110B. In some embodiments, this transmission is done through a proximity based communication mechanism. For example, in one embodiment, the recipient device displays, on a display device, an image such as a QR code or barcode which encodes introduction data 130. In some embodiments, the displayed image is captured by an imaging or other scanning device at the sender's device 110B, which can be decoded to obtain the introduction data 130.

In some embodiments, the introduction data 130 can be sent through near field communication (NFC), radio-frequency identification (RFID), or any other proximity based communications. Communication over these mechanisms can be described as being a communication over a proximity-based communication channel.

In some embodiments, a proximity-based communication channel can involve any communication mechanism which requires a line of sight between the communicating devices. In some situations, the proximity-based communication mechanism may require for the two communicating devices to touch or to be in visual range of each other, which may enable a user to visually confirm the identity of the user of the other device.

In some embodiments, the device may require a user to authorize the transmission of the introduction data by inputting credentials once the user has made visual confirmation of the other user's identity. In some embodiments, this can include entering a password or providing biometric information to the device such as a fingerprint or facial scan. In some embodiments, upon receipt of the credentials, the device transmits the introduction message.

In some embodiments, the introduction data 130 can be sent through other communication mechanisms such as Bluetooth™, WiFi, SMS, and the like; however, in some instances, these approaches may be less secure. In some embodiments, QR codes, NFC or other proximity communication mechanisms may be used to initiate a pairing of the two devices 110A, 110B (e.g. Bluetooth™ pairing) which may, in some instances, improve the security of the transmission and/or reduce the likelihood of third party eavesdropping or interception.

In some embodiments, the introduction data 130 includes receiver identification data and an encryption key. In some embodiments, the receiver identification data includes an email address or other information required for the server 120 to identify and/or communicate with the receiver device 110A or an account associated with the receiver/receiver device 110A. For example, if the server requires an email address or user ID to contact the account associated with the receiver or receiver device 110A, this information can be included in the receiver identification data. In some examples, the receiver identification data can include a phone number associated with the receiver device, an account number or other identifier, a username or any other identifier(s) associated with the receiver device or a receiver account.

In some embodiments, the introduction data 130 includes an encryption key. The encryption key can, in some embodiments be an asymmetric key. For example, the encryption key communicated in the introduction data can be a public key that is part of a public-private key pair. The private key can be stored on the recipient device 110A.

In some embodiments, the new keys can be generated periodically, or each time introduction data is to be transmitted to a sender device 110B.

In some embodiments, the encryption key can be a symmetric key. However, in some instances, this may be less secure than an asymmetric key.

In some embodiments, the introduction data can include transaction information such as a payment amount.

Upon receipt of the introduction data, in some embodiments, the sender device 110B is configured to generate a processing request 140 for initiating a process with the server 120, such as an IEMT. The generated processing request 140 may include a number of fields such as a recipient identifier field (e.g. email address), payor data field(s) (e.g. information for identifying and authorizing access to a payment account, a payment amount, etc.), a challenge field, and a challenge answer field. In some embodiments, the fields may include a memo field and/or any other optional information field. The number, format and type of fields in the initiation request may be defined by a protocol or service provided by the server 120.

In some embodiments, one or more processors on the sender device generate the payment data fields based on the introduction data and/or data inputted by the sender at the sender device. For example, the sender may input a payment amount or other data on a keypad, touchscreen, or other input device. In some embodiments, the payee info may be based on data from the introduction data received from the recipient device 110A or data inputted at the sender device 110B.

In some embodiments, the processor(s) on the sender device 110B generate data for security answer field. In some embodiments, the security answer may be generated by a random number generator. In some embodiments, the security answer may be generated from an input from the sender, for example by hashing or encoding a text or other input received at the sender device.

In some embodiment, the generated security answer may be a random or pseudo-random string of text or other characters. In some instances, the random nature of the security answer is more difficult to guess by a third party than a recognizable word or numerical security answer provided by the sender.

In some embodiments, the processor(s) on the sender device 110B generate data for communicating the security answer to the recipient in one or more of the data fields sent 182 to the server with the processing request 140. In some embodiments, the number, type, length, and/or arrangement of the data fields must meet the requirements of the application/process/service running on the server.

In some embodiments, the sender device processor(s) encrypt the security answer with the security key provided in the introduction data. The encrypted security answer is then sent with the processing request in any field which is ultimately sent to the recipient device 110A as part of the challenge notification. For example, the encrypted security answer can be sent in a challenge question field, a memo field, a description field, or any other non-functional field. In some embodiments, the processor(s) repurpose one or more of these fields (which are intended to store other data) to store the encrypted security answer.

In some embodiments, the encrypted security answer may be split across multiple fields. For example, if an encrypted security answer is too long to fit in the challenge question field, a portion of the encrypted security answer may be sent in the encrypted security answer field and a portion of the encrypted security answer may be sent in a memo field. In some instances, utilizing multiple defined fields to send an encrypted security answer may allow for longer answers which may improve the security of the process. In some instances, the arrangement of the encrypted security answer across the multiple fields may further obfuscate the security answer.

The server 120 processes the processing request 140 which may include accessing payment servers and accounts, verifying/authenticating payor information, processing funds, and/or any other actions required for the server 120 to process the request. In some embodiments, the server 120 may operate in its traditional manner with its traditional request data fields, and may be unaware of the aspects of the authentication process occurring between the sender and recipient devices outside of the server process.

In some instances, embodiments of the methods and systems described herein may operate without requiring any modification or control of the server 120.

The server 120 sends a challenge notification 150 to the recipient device 110A. In some embodiments, the challenge notification 150 includes a number of data fields such as a challenge question field, memo fields, description fields, and/or any other field. Some or all of the data in these fields may be obtained from the sender device 110B in the processing request 140. In some embodiments, each field containing a portion of the encrypted challenge answer is included in the challenge notification 150.

In some embodiments, the challenge notification provides access to the challenge notification data fields. For example, in some embodiments, the challenge notification message may include a link, URL, credentials or otherwise provide access to a web page, server or data service which presents or transmits the data fields to the recipient device.

In some embodiments, the challenge notification may be an email message, an SMS, or any other messaging service or protocol. For example, an IEMT challenge notification may be an email to a recipient email address which includes payor information, payment data fields, as well as a challenge question and memo/description fields.

In some embodiments, a process operating on the recipient device 110A is configured to recognize and to begin processing the challenge notification. In some embodiments, the recipient device 110A does not need to display and/or request challenge question information to a user. The recipient device 110A may optionally display a portion of the notification including payor information, payment amount, and/or any other field that does not contain the encrypted security answer.

In some embodiments, the recipient device 110A may display a confirmation user interface for requesting and receiving a confirmation input indicating that the recipient accepts the process/transaction identified in the challenge notification. In some embodiments, the recipient device 110A may automatically process the challenge notification without receiving any input or confirmation from the user. In some such embodiments, confirmations and display of process/transaction details may occur before the transmission of the introduction message.

The recipient device 110A obtains the encrypted security answer from the challenge notification fields, and decrypts the security answer using the encryption key stored at the recipient device 110A (e.g. private key in a private-public key pair, or the symmetric key).

In some embodiments, the recipient device 110A identifies the encrypted challenge response value (security answer) from one or more data fields provided by the challenge notification.

In some embodiments, processors at the recipient device 110A combine values from two or more of the data fields to obtain the encrypted challenge response value. In some embodiments, combining the values can include concatenating the two or more values from different data fields into a single value. In other embodiments, other logical or mathematical operations can be performed to combine the values.

At 186, the recipient device 110A sends a challenge response 160 including the security answer (decrypted challenge response) to the server 120 to complete the challenge and initiate a data process. In some embodiments, initiating the data process can include initiating the process to transfer funds from an account associated with the recipient to the account associated with the sender.

In some embodiments, the system may be utilized for other data processes such as secure file sharing. In some such embodiments, upon successful completion of the challenge, the server may present or enable access to one or more files to the recipient device.

In other embodiments, the system, devices and methods described herein may be applied to initiate any other suitable data process involving verification or input from multiple parties.

In some instances, the automatic generation of security questions and answers, and the automatic processing of the challenge notification and response can simplify and/or speed up the process between the sender and the recipient while still maintaining the security of an authenticated transaction via visual recognition and confirmation of the sender/recipient and/or the proximity of the devices.

If an asymmetric key pair is used in the process, only the recipient device 110A which holds the private key is able to decrypt the security answer, so any third party who may intercept the challenge notification will not be able to guess or otherwise answer the challenge question.

In some embodiments, the introduction message can include an identifier for associating the data process. For example, the recipient device 110A can be configured to generate a unique identifier for associated with the data process to be initiated by the server, and storing this unique identifier in association with an encryption key corresponding to the key sent with the introduction message. The sender device 110B will include the unique identifier in the processing request to the server, and the server includes the unique identifier with the challenge notification data fields. In this manner, the recipient device 110A is able to identify the correct key for decrypting the encrypted response value by accessing the stored key associated with the identifier.

Figure 2:
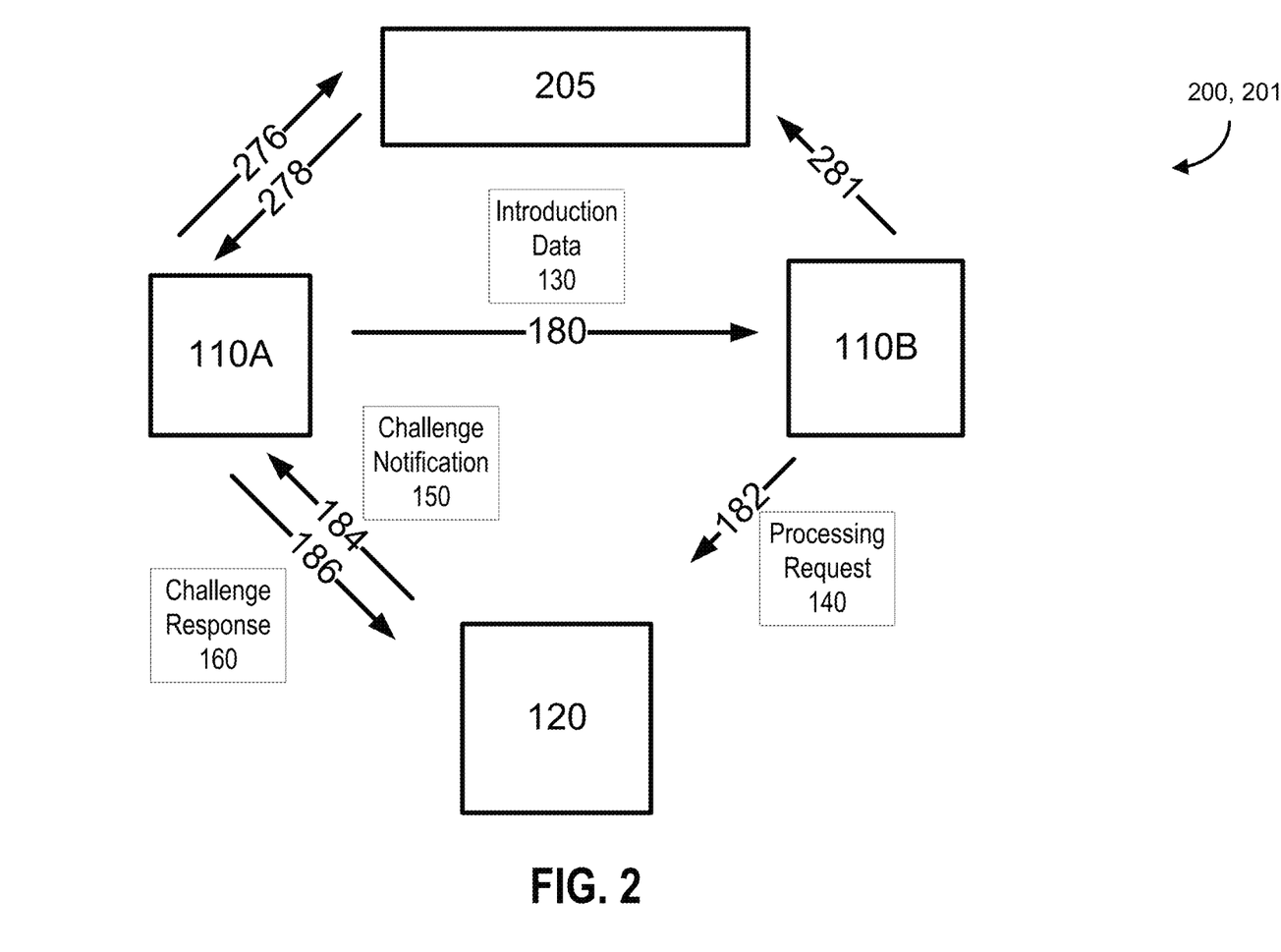
FIG. 2 is a schematic diagram showing aspects of another example system and data flow.

FIG. 2 shows aspects of another example system 200 and data flow 201 between devices in the system. Similar to FIG. 1, the system 100 includes a device 110A associated with a recipient, a device 110B associated with a sender, and a server 120.

The example system 200 in FIG. 2 includes an authentication server 205. In some embodiments, before a recipient device 110A sends introduction data 130 to a sender device 110B, the recipient device 110A sends the encryption key and/or the sender identifier to the authentication server 205 to be signed. In some embodiments, the recipient device or a recipient account must be registered and authenticated with the authentication server. The authentication server 205 digitally signs the encryption key and/or the sender identifier to the recipient device 110A which sends the signed encryption key and/or the sender identifier in the introduction data 130. In some embodiments, a signature for the encryption key and/or the sender identifier can hashing and/or encoding the encryption key and/or the sender identifier with a key at the authentication server 205.

Upon receipt of the signed encryption key and/or sender identifier, at 281, before sending the processing request 140, the sender device 110B verifies the signature of the encryption key and/or sender identifier with the authentication server.

In some instances, this may improve the verification of the authenticity of the receiver device, and/or may provide some control over which devices may utilize the system 200.

In some embodiments, the operations of the receiver device and/or the sender device may be provided for and/or controlled by an application operating on the respective devices. For example, a mobile wallet application running on each device may provide for the generation, communication and/or processing of the introduction message 130, the processing request 140, the challenge notification 150 and/or the challenge response 160.

In some embodiments, the recipient device 110A may send a data field to the sender device 110B in the introduction data or otherwise which indicates an application, version and/or capability of the recipient device 110A to automatically process the challenge notification from the server 120.

In some embodiments, the sender device 110B may include a defined string or other indicator in one of the challenge question, memo or other fields. The defined string or other indicator can, in some instances, be used to indicate that the challenge notification can be automatically processed by decrypting the answer in one of the fields. Upon receipt of a challenge notification including the defined identifier, a process running on the receiver's device can recognize the challenge notification as a notification that can be automatically processed.

In some embodiments, additional decoding data may be included in one of the fields provided by the sender device and included in the challenge notification. In some examples, the additional decoding data may indicate a decrypting scheme, a location of the encrypted answer, and/or any other information or parameter for identifying and/or decrypting the encrypted answer.

In some embodiments, a sender and recipient may verify each other's identities even when they are not in close proximity to each other. For example, a sender and recipient may be communicating over a video call. In some embodiments, the introduction data 130 can be communicated from the recipient device 110A to the sender device 110B by the recipient presenting the QR code on the recipient device 110A up to the video call camera, which can be captured by the sender device 110B from a display showing the video call.

In the examples in FIGS. 1 and 2, the introduction message is transmitted from the recipient device 110A to the sender device 110B. However, in other embodiments, the introduction message including the first encryption key can be transmitted from the sender device 110B to the recipient device 110A.

Figure 4:
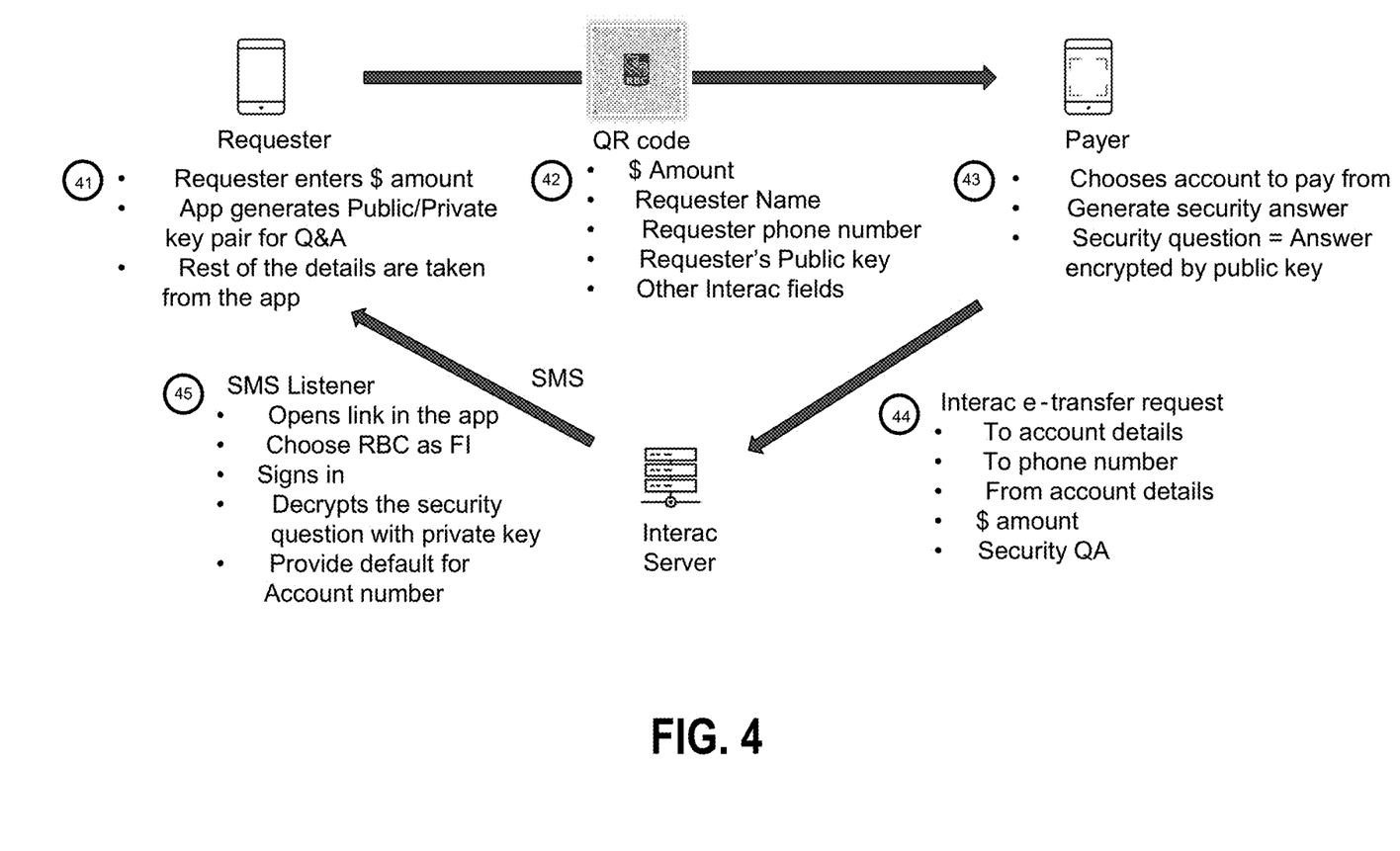
FIG. 4 is schematic diagram showing aspects of an example system and data flow.

In conjunction with the systems described herein or otherwise, FIG. 4 shows aspects of an example data flow diagram including interactions with an Interac e-Transfer™ server.

At 41, a requester device receives one or more inputs including an amount which is being requested to be transferred to an account associated with the requester device. In some embodiments, the input can be received from an input device such as a keypad, touchscreen, audio microphone or any other suitable input device. In some embodiments, the input can be received from an application or process operating on the requester device. For example, the input can be received from a payment application, an intelligent personal assistant (e.g. Apple Inc.'s Siri™ or Google Assistant™), a mobile wallet, a messaging application, a banking application or the like.

In some embodiments, the requester device generates a public/private key pair for use in the introduction information. In some embodiments, data fields corresponding to a requester profile are obtained from a payment application, an address book database, a user profile or otherwise. In some embodiments, some of this information may be selected from a list or received via an input device.

At 42, introduction data is send to the payer device. In FIG. 4, the introduction data is illustrated as being encoded in a QR code for communication to the payer device. In some embodiments, the introduction data include a payment amount, a requester name or other identifier, a requester phone number or e-mail address, the public key generated by the requester device, and/or any other fields which may be used by the Interac server.

At 43, the payer device receives the introduction data. In some embodiments, the payer device is configured to receive an input selecting an account associated with the payer device. In some embodiments, the account may be selected automatically from a payer profile. In some embodiments, upon receiving the introduction data, the payer device is configured to request a confirmation input to confirm that a user associated with the payer device authorizes the payment.

Upon receipt of such authorization, the payer device is configured to generate a security answer. The payer device encrypts the security answer with the public key for use in the security question.

At 44, the payer device sends an Interac e-transfer request to the Interac server. In some embodiments, the request includes a requester (destination) account identifier, a requestor email address or phone number, a payer (source) account identifier, a payment amount, and a security question which includes the encrypted security answer.

When the request is processed by the Interac server, the Interac server sends a challenge notification via an SMS or email to the requester device.

In some embodiments, the requester device is configured to execute an SMS or an e-mail listener application or process. In some embodiments, the listener application or process automatically detects messages including the challenge notification. In some embodiments, the requester device automatically select a default account for depositing the payment, optionally logs in to the account if required, and decrypts the security answer from the security question using the private key stored at the requester device.

In some embodiments, some of these steps may not be automatic and may require input from the user. For example, the device may require confirmation that the user wishes to receive the transfer, the device may require that the user input credentials to log into a financial institution account/application, and/or the device may require that the user select a financial institution and/or account rather than relying on a default value stored in a user profile or application.

Upon providing the security answer and selecting the account, the payment is handled by the Interac server.

In some instances, this system/process may provide for a simplified yet secure method for interacting with an existing payment infrastructure.

Figure 5:
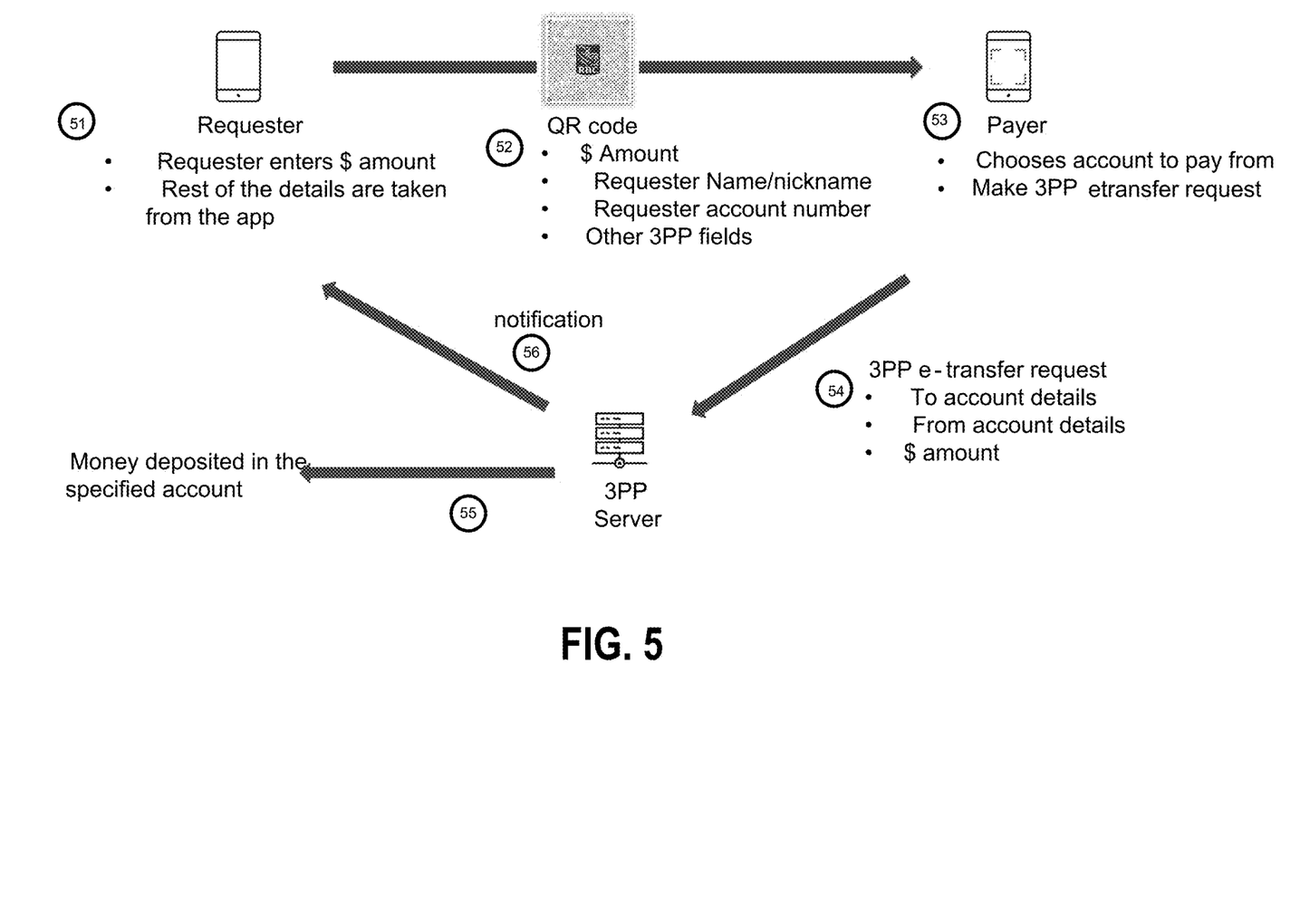
FIG. 5 is schematic diagram showing aspects of another example system and data flow.

In conjunction with the systems described herein or otherwise, FIG. 5 shows aspects of an example data flow diagram including interactions with an electronic funds transfer server.

At 51, a requester device receives one or more inputs including an amount which is being requested to be transferred to an account associated with the requester device. In some embodiments, the input can be received from an input device such as a keypad, touchscreen, audio microphone or any other suitable input device. In some embodiments, the input can be received from an application or process operating on the requester device. For example, the input can be received from a payment application, an intelligent personal assistant (e.g. Apple Inc.'s Siri™ or Google Assistant™), a mobile wallet, a messaging application, a banking application or the like.

In some embodiments, introduction data fields corresponding to a requester name/nickname/identifier, a requester name and/or other fields used in an electronic funds transfer (such as 3PP) are obtained from a payment application, an address book database, a user profile or otherwise. In some embodiments, some of this information may be selected from a list or received via an input device.

At 52, introduction data is send to the payer device. In FIG. 5, the introduction data is illustrated as being encoded in a QR code for communication to the payer device. In some embodiments, the introduction data include a payment amount, a requester name/nickname or other identifier, a requester account number or other account identifier, and/or any other fields which may be used by the 3PP server.

At 53, the payer device receives the introduction data. In some embodiments, the payer device is configured to receive an input selecting an account associated with the payer device. In some embodiments, the account may be selected automatically from a payer profile. In some embodiments, upon receiving the introduction data, the payer device is configured to request a confirmation input to confirm that a user associated with the payer device authorizes the payment. In some embodiments, the requestor account number or other account identifier may be obfuscated, partially masked or otherwise not displayed to the user at the payer device.

At 54, the payer device sends a 3PP e-transfer request to the Interac server. In some embodiments, the request includes a requester (destination) account identifier, and a payer (source) account identifier, a payment amount.

At 55, the request and transfer of funds is processed by the 3PP server. At 56, the 3PP server sends a notification to the requester and/or payer device indicated the transfer was successful. In some instances, this system/process may provide for a simplified yet secure method for interacting with an existing payment infrastructure.

Figure 6:
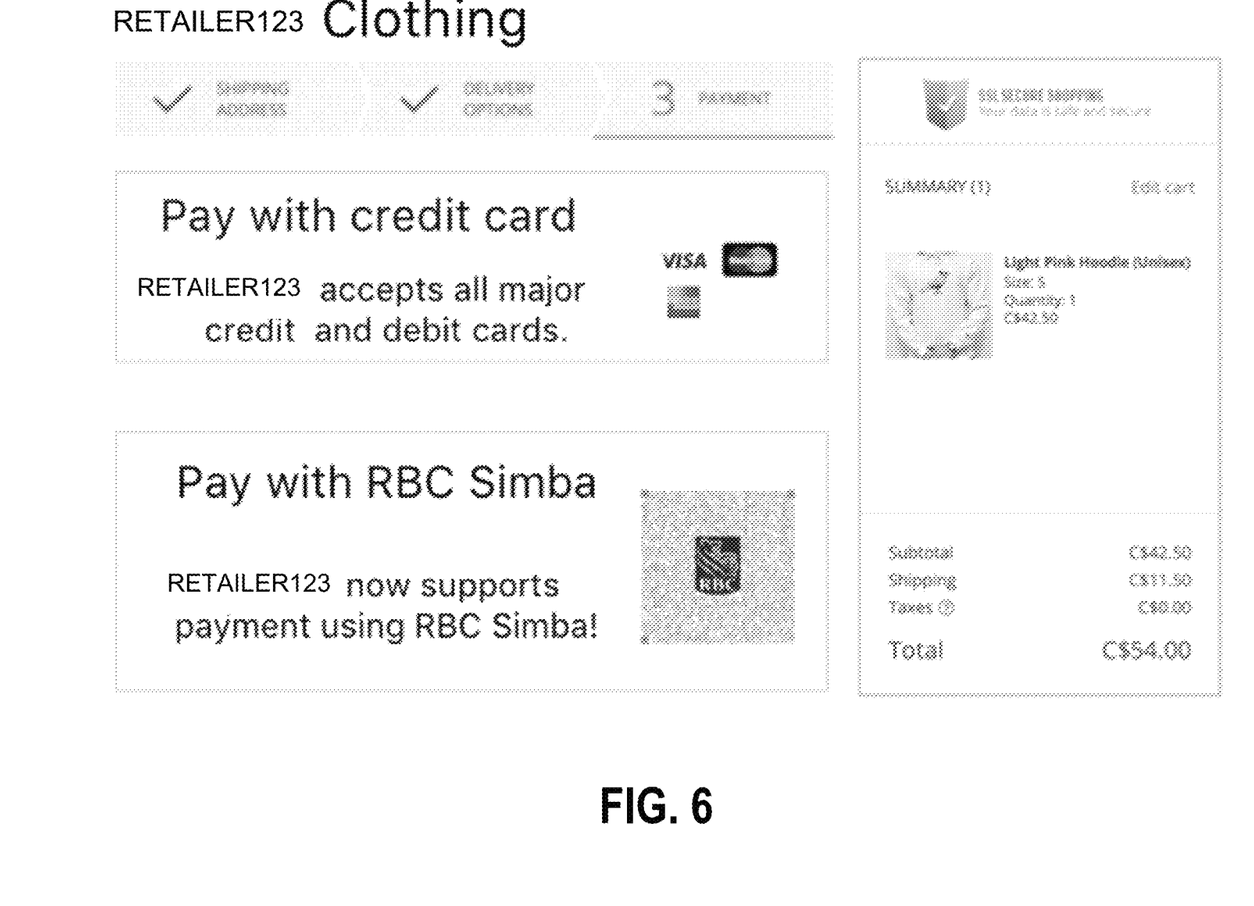
FIG. 6 is an example user interface including a code for communicating introduction data.
Figure 7:
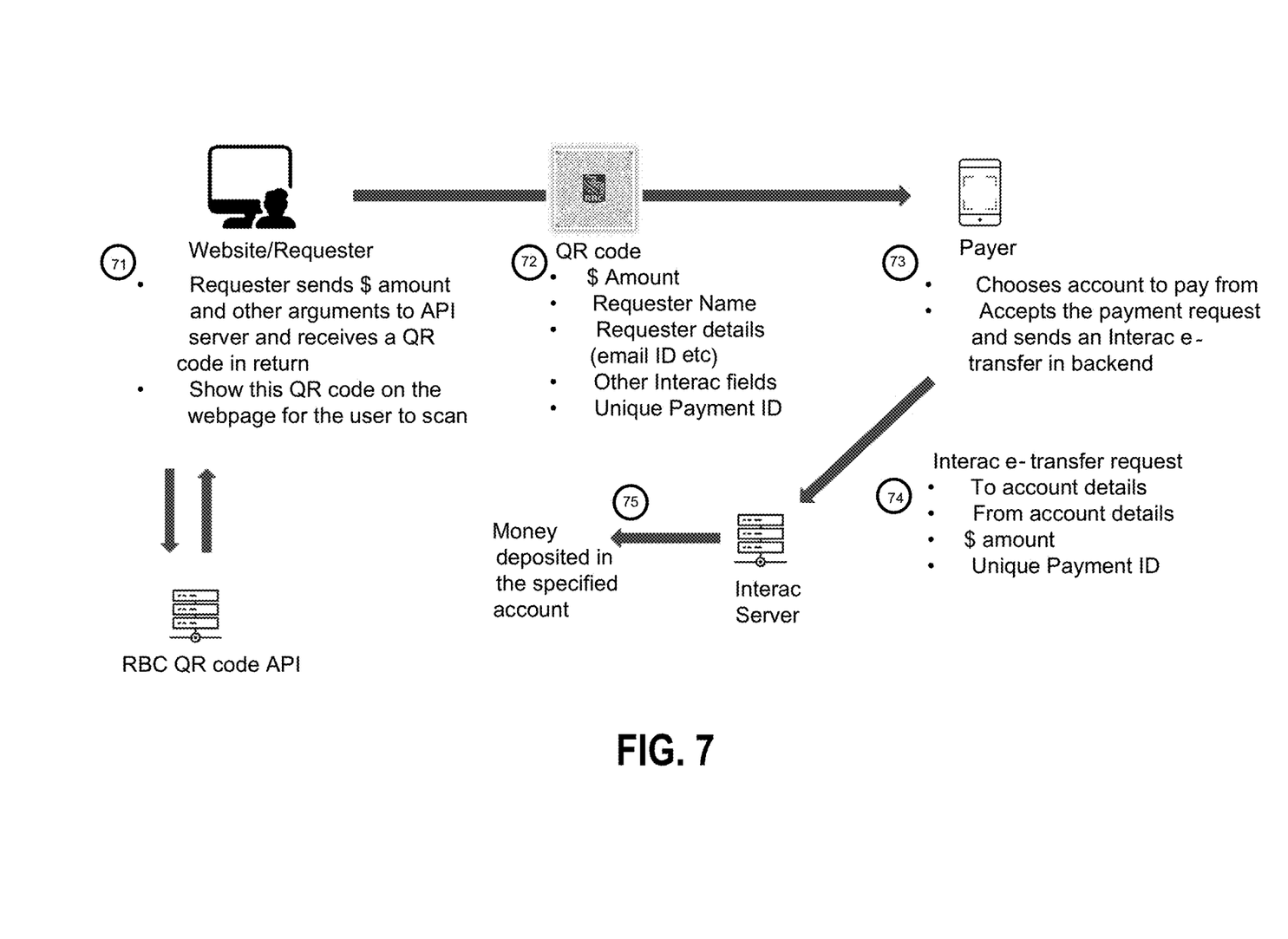
FIG. 7 is schematic diagram showing aspects of another example system and data flow.

In conjunction with the systems described herein or otherwise, FIG. 6 shows aspects of an example user interface. In some embodiment such a user interface may be generated by a web server for an online retailer. The user interface includes a QR code for providing introduction information to a customer/payer device. Aspects of an example data flow which makes use of the introduction information on a website is shown in FIG. 7.

At 71, the requester device (i.e. web server or an associated requester device or process) obtains one or more inputs including an amount which is being requested to be transferred to an account associated with the requester device. In some embodiments, the input can be received or generated by the web server or an associated online commerce server. For example, the amount may be a total purchase amount for an online transaction (e.g. the total purchase mount of $54 as illustrated in the example user interface in FIG. 6).

In some embodiments, the requester device sends the amount value and optionally any other introduction data values to a QR code API server. The QR code API server generates a QR code using the amount value and other optional values, and provides the QR code for display on the website.

In other embodiments, the requester device may run a local API or otherwise generate a QR code with an API server.

In some embodiments, data fields corresponding to a requester profile are automatically sent by the requester device to be encoded in the QR code. In some embodiments, the API server may automatically select the data fields to be encoded by matching the requester with a database of requesters available to the API server.

At 72, introduction data is received by the payer device by scanning the QR code. In some embodiments, the introduction data include a payment amount, a requester name or other identifier, a requester phone number or e-mail address, the public key generated by the requester device, and/or any other fields which may be used by the Interac server. In some embodiments, the introduction data includes a unique payment ID.

In some embodiments, the encryption key and encoded answer in a challenge question field mechanism as described above may be applied.

At 73, the payer device receives the introduction data. In some embodiments, the payer device is configured to receive an input selecting an account associated with the payer device. In some embodiments, the account may be selected automatically from a payer profile. In some embodiments, upon receiving the introduction data, the payer device is configured to request a confirmation input to confirm that a user associated with the payer device authorizes the payment.

Upon receipt of such authorization, the payer device is configured to generate a security answer. The payer device encrypts the security answer with the public key for use in the security question.

At 74, the payer device sends an Interac e-transfer request to the Interac server. In some embodiments, the request includes a requester (destination) account identifier, a requestor email address or phone number, a payer (source) account identifier, a payment amount, and the unique payment ID.

At 75, the payment request is processed as described in the other examples herein or otherwise.

In some situations, the online payment system may enable small businesses that use personal rather than commercial accounts to receive online payments.

In some embodiments, the online payment system can work with existing payment infrastructure such as Interac and can be agnostic as to the financial institution server that is being used.

In some embodiments, the online payment system can be set to auto-deposit such that transferred funds are automatically deposited without requiring receipt of a manually-inputted confirmation.

In some embodiments, the auto deposit system will identify a destination account based on an email ID. In some embodiments, aspects of the auto deposit system may allow for the traditional question-answer security to be removed from the process.

Figure 8:
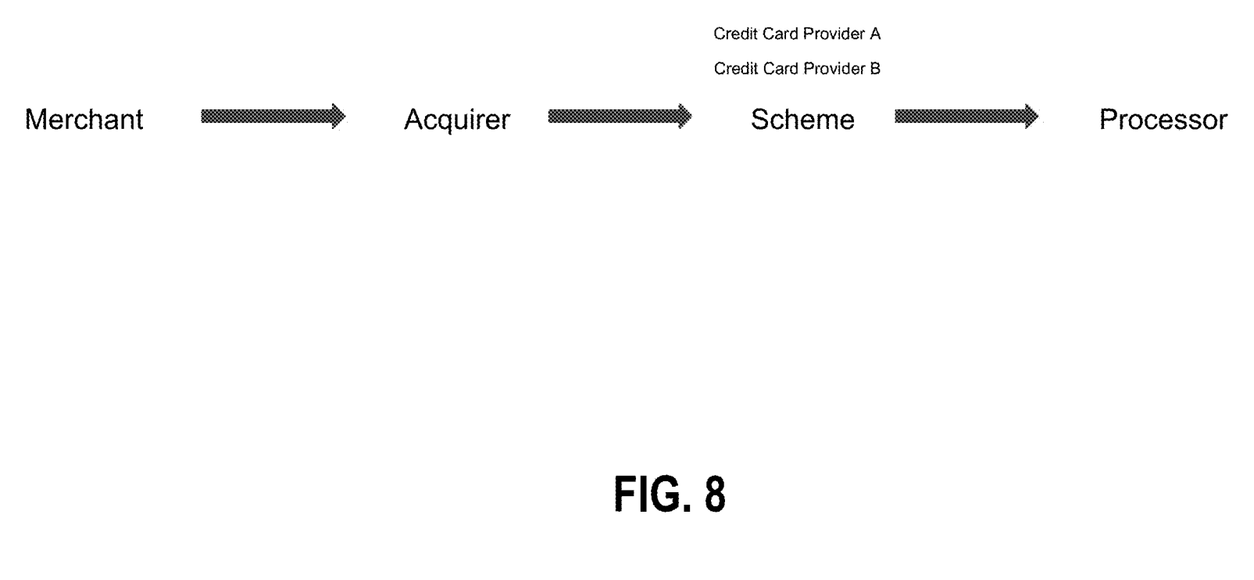
FIG. 8 shows an example payment processing data flow.

Aspects of the system, processes and architectures described herein may be applied to the traditional merchant-acquirer-credit card processor system illustrated in FIG. 8.

Figure 9:
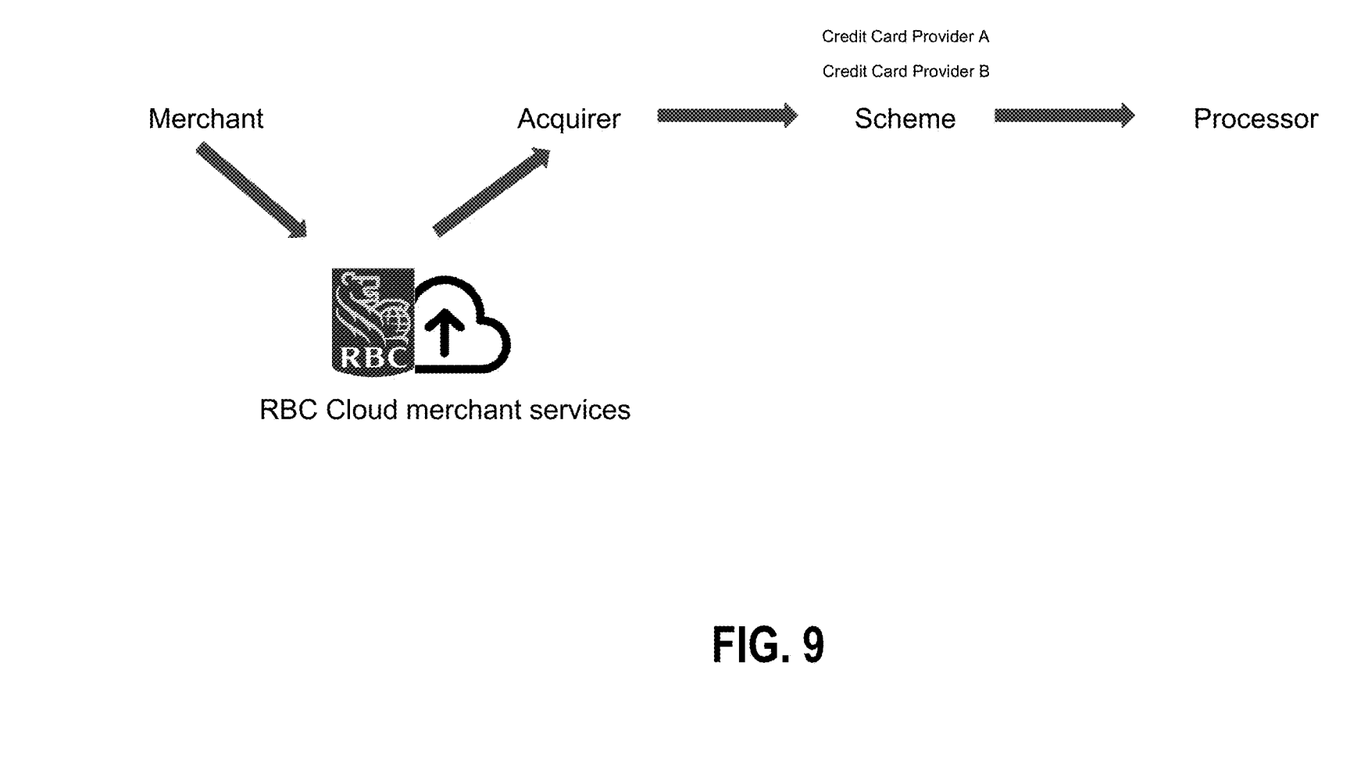
FIG. 9 shows another example payment processing data flow.

For example, as illustrated in FIG. 9, a financial institution server can be positioned between the merchant system and the acquirer system.

In some embodiments, the financial institution server can be configured to handle acquiring and settlement for client accounts associated with the financial institution. In some embodiments, the financial institution can take on the risk of defaults while the acquirer can provide the technical infrastructure. In some embodiments, the acquirer cost may be lower as the risk is taken on by the financial institution. In some situations, the financial institution may be better suited to handle the risk as the accounts are known to the financial institution through their personal accounts.

In some embodiments, the financial institution can approve new accounts faster (instantly). In some embodiments, NFC tap on phone technology can be used which in some instances may be more secure. This may, in some situations, result in lower fees.

In some situations NFC tap ability can be provided via an application that is installed at a requester device and will not require physical hardware such as a point-of-sale terminal to be sent to a new merchant.

Figure 3:
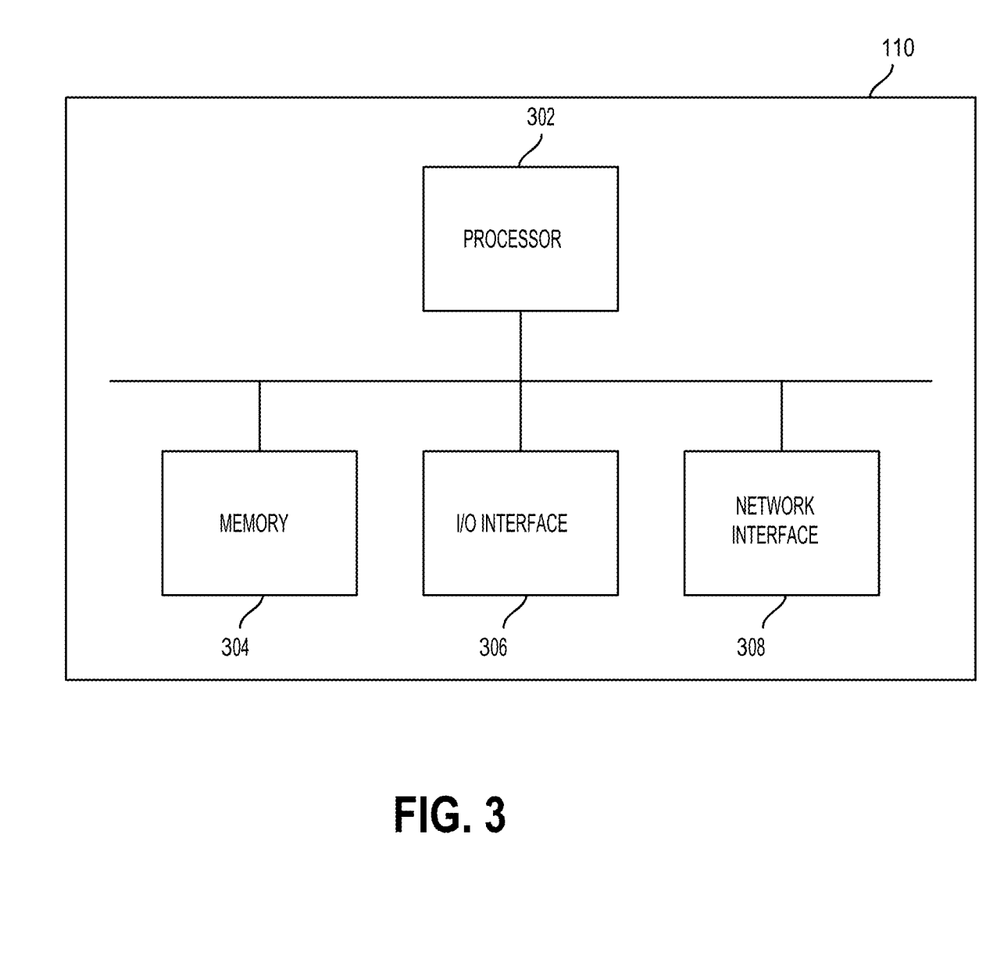
FIG. 3 is a schematic diagram of computing device, exemplary of an embodiment.

FIG. 3 is a schematic diagram of computing device 110, exemplary of an embodiment. As depicted, computing device 110 includes at least one processor 302, memory 304, at least one I/O interface 306, and at least one network interface 308.

Each processor 302 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 304 may include a suitable combination of any type of computer memory that is located either internally or externally such as, for example, random-access memory (RAM), read-only memory (ROM), compact disc read-only memory (CDROM), electro-optical memory, magneto-optical memory, Ferroelectric RAM (FRAM), etc.

Each I/O interface 306 enables computing device 110 to interconnect with one or more input devices, such as a keyboard, mouse, camera, touch screen and a microphone, or with one or more output devices such as a display screen and a speaker.

Each network interface 308 enables computing device 110 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 110 is operable to register and authenticate users (using a login, unique identifier, and password for example) prior to providing access to applications, a local network, network resources, other networks and network security devices. Computing devices may serve one user or multiple users.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized.

As can be understood, the examples described above and illustrated are intended to be exemplary only.

What is claimed is:

1. An electronic device, comprising:
   at least one communication interface;
   at least one memory; and
   at least one processor configured for:
      communicating between the electronic device and a second electronic device over proximity-based communication channel an introduction message including a first encryption key;
      receiving a challenge notification providing notification of a challenge to be completed to initiate a data process, the challenge notification including an encoded message generated based on data communicated between the electronic device and the second electronic device and at least one data field associated with a verification challenge,
      the at least one data field including a challenge response value, the challenge response value encoded by the second electronic device based on the first encryption key included with the introduction message;
      deriving the challenge response value based on the encoded message corresponding to the first encryption key; and
      transmitting the derived challenge response value to a server to complete the verification challenge to initiate the data process.

2. The electronic device of claim 1, wherein the first encryption key is a first key of an asymmetric encryption key pair, and the encoded message corresponding to the first encryption key is a second key of the asymmetric encryption key pair; or
   wherein the first encryption key is the same as the encoded message corresponding to the first encryption key.

3. The electronic device of claim 1, wherein the proximity-based communication channel is at least one of a near-field communication channel, a radio-frequency identification channel, or a short-range wireless communication channel.

4. The electronic device of claim 1, wherein the proximity-based communication channel involves:
   displaying an image including encoded introduction message data for scanning by the second electronic device; or
   scanning the image including the encoded introduction message data displayed by the second electronic device.

5. The electronic device of claim 1, wherein the at least one processor is configured for transmitting the introduction message to the second electronic device; and wherein the introduction message includes: challenger identification data comprising a destination identifier or address for the server to communicate with the electronic device.

6. The electronic device of claim 1, wherein the at least one processor is configured for:
   transmitting the introduction message to the second electronic device, the introduction message including a first identifier for associating with the data process;
   storing the first identifier in conjunction with the encoded message corresponding to the first encryption key; and
   upon receipt of the challenge notification including or providing access to the at least one data field including a data process identifier, identifying the encoded message corresponding to the first encryption key for deriving the challenge response value when the data process identifier matches the first identifier.

7. The electronic device of claim 1, wherein the challenge notification includes or provides access to a plurality of data fields; and wherein the encoded message comprises combining values from at least two of the plurality of data fields.

8. The electronic device of claim 1, wherein the data process electronically transfers funds from an account associated with the second electronic device to an account associated with the electronic device.

9. The electronic device of claim 1, wherein the proximity-based communication channel involves: displaying, over a video call, an image including encoded introduction message data for scanning by the second electronic device.

10. A method for multi-party initiation of a data process, the method comprising:
    communicating between a first electronic device and a second electronic device over proximity-based communication channel an introduction message including a first encryption key;
    receiving a challenge notification providing notification of a challenge to be completed to initiate a data process, the challenge notification including an encoded message generated based on data communicated between the first electronic device and the second electronic device and at least one data field associated with a verification challenge,
    the at least one data field including a challenge response value, the challenge response value encoded by the second electronic device based on the first encryption key included with the introduction message;
    deriving the challenge response value based on the encoded message corresponding to the first encryption key; and
    transmitting the derived challenge response value to a server to complete the challenge to initiate the data process.

11. The method of claim 10, wherein the first encryption key is a first key of an asymmetric encryption key pair, and the encoded message corresponding to the first encryption key is a second key of the asymmetric encryption key pair; or
    wherein the first encryption key is the same as the encoded message corresponding to the first encryption key.

12. The method of claim 10, wherein the proximity-based communication channel is at least one of a near-field communication channel, a radio-frequency identification channel, or a short-range wireless communication channel.

13. The method of claim 10, wherein the proximity-based communication channel involves:
    displaying an image including encoded introduction message data for scanning by the second electronic device; or
    scanning the image including the encoded introduction message data displayed by the second electronic device.

14. The method of claim 10, comprising transmitting the introduction message to the second electronic device; and wherein the introduction message includes: challenger identification data comprising a destination identifier or address for the server to communicate with the electronic device.

15. The method of claim 10, comprising:
    transmitting the introduction message to the second electronic device, the introduction message including a first identifier for associating with the data process;
    storing the first identifier in conjunction with the encoded message corresponding to the first encryption key; and
    upon receipt of the challenge notification including or providing access to the at least one data field including a data process identifier, identifying the encoded message corresponding to the first encryption key for deriving the challenge response value when the data process identifier matches the first identifier.

16. The method of claim 10, wherein the challenge notification includes or provides access to a plurality of data fields; and wherein the encoded message comprises combining values from at least two of the plurality of data fields.

17. The method of claim 10, wherein the data process electronically transfers funds from an account associated with the second electronic device to an account associated with the electronic device.

18. The method of claim 10, wherein the proximity-based communication channel involves: displaying, over a video call, an image including encoded introduction message data for scanning by the second electronic device.

* * * * *